United States Patent
Swenson, Sr. et al.

[11] Patent Number: 5,873,580
[45] Date of Patent: Feb. 23, 1999

[54] TOOL HOLDER WITH INTERCHANGEABLE COLLET/CHUCK SYSTEM

[75] Inventors: Albert L. Swenson, Sr.; Albert L. Swenson, Jr.; Mark S. Lane, all of Grandview, Mo.

[73] Assignee: Commando Products, Inc., Grandview, Mo.

[21] Appl. No.: 785,352

[22] Filed: Jan. 17, 1997

[51] Int. Cl.[6] .................................................. B23B 31/20
[52] U.S. Cl. ............................ 279/49; 279/54; 279/46.3
[58] Field of Search ................................ 279/42, 48, 49, 279/54, 55, 56, 43.2, 46.2, 46.3

[56] References Cited

U.S. PATENT DOCUMENTS

| | | | |
|---|---|---|---|
| 1,615,201 | 1/1927 | Stowe et al. | 279/53 |
| 1,973,942 | 9/1934 | Buhr | 279/49 |
| 2,098,675 | 11/1937 | Procunier | 279/42 |
| 2,398,924 | 4/1946 | Daniels | 279/46.3 |
| 2,702,192 | 2/1955 | Warth | 279/49 |
| 3,918,727 | 11/1975 | Forsythe | 279/50 |

FOREIGN PATENT DOCUMENTS

| | | | |
|---|---|---|---|
| 770207 | 3/1957 | United Kingdom | 279/48 |

*Primary Examiner*—Steven C. Bishop
*Attorney, Agent, or Firm*—Litman, McMahon & Brown, L.L.C.

[57] ABSTRACT

A tool holder for small hand tools such as screw driver sets, drill sets, etc., which tool holder has external threads near one end which accommodate a compression sleeve which fits over and compresses a tool holding collet/chuck. Within the tool holder is a female hex shaped receptacle which is sized to accommodate a male hex shaft of the collet/chuck. The hex shaped receptacle in the tool holder and the hex shafts of the collet/chuck's act to prevent the collet/chuck's from turning when the tool is subjected to high levels of torque and also allow collet/chuck to be easily interchanged so that a single tool holder can be used to accommodate tools with a variety of shaft cross-sectional shapes such as round, square, hexagonal, etc.

3 Claims, 3 Drawing Sheets

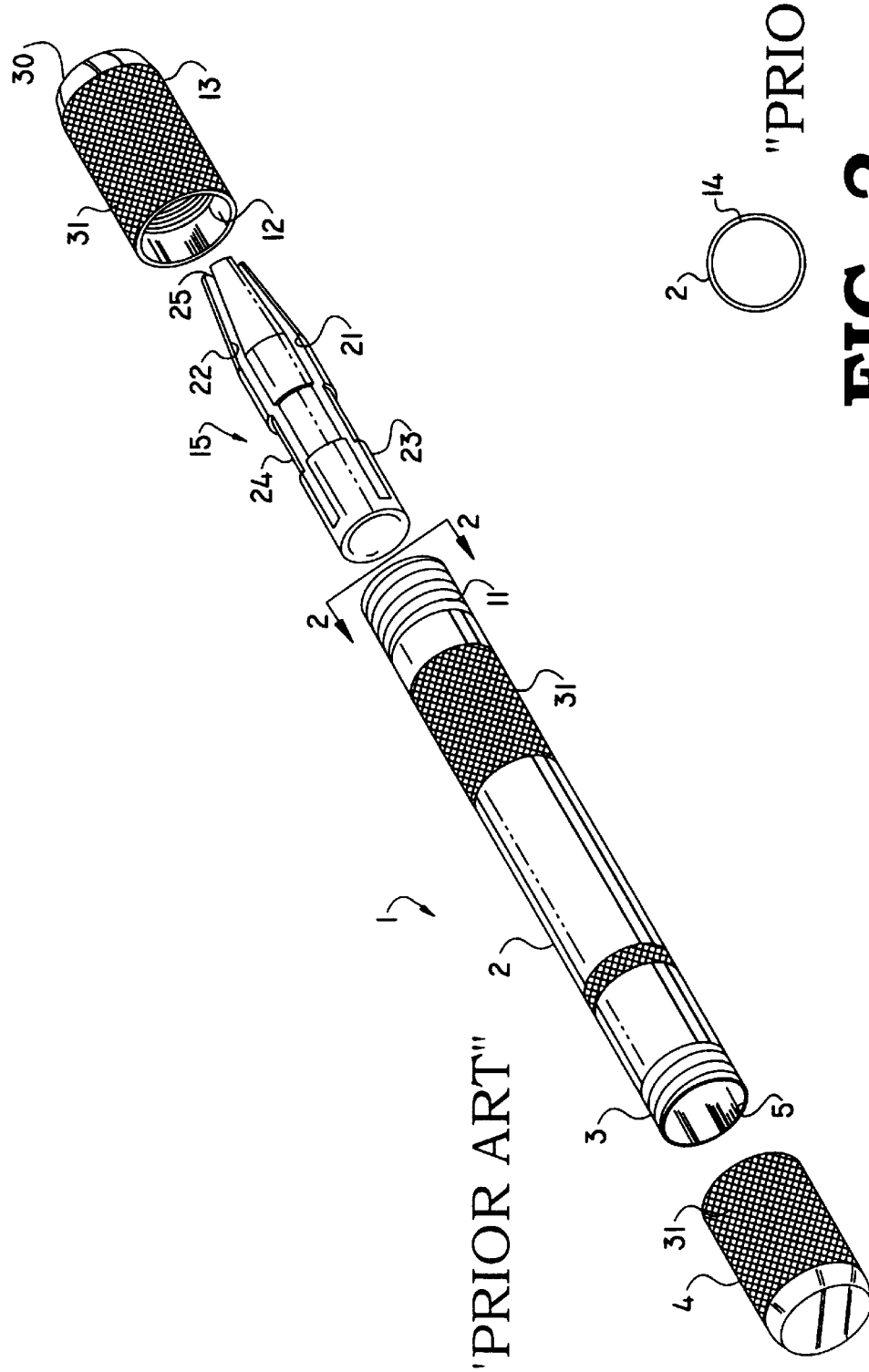

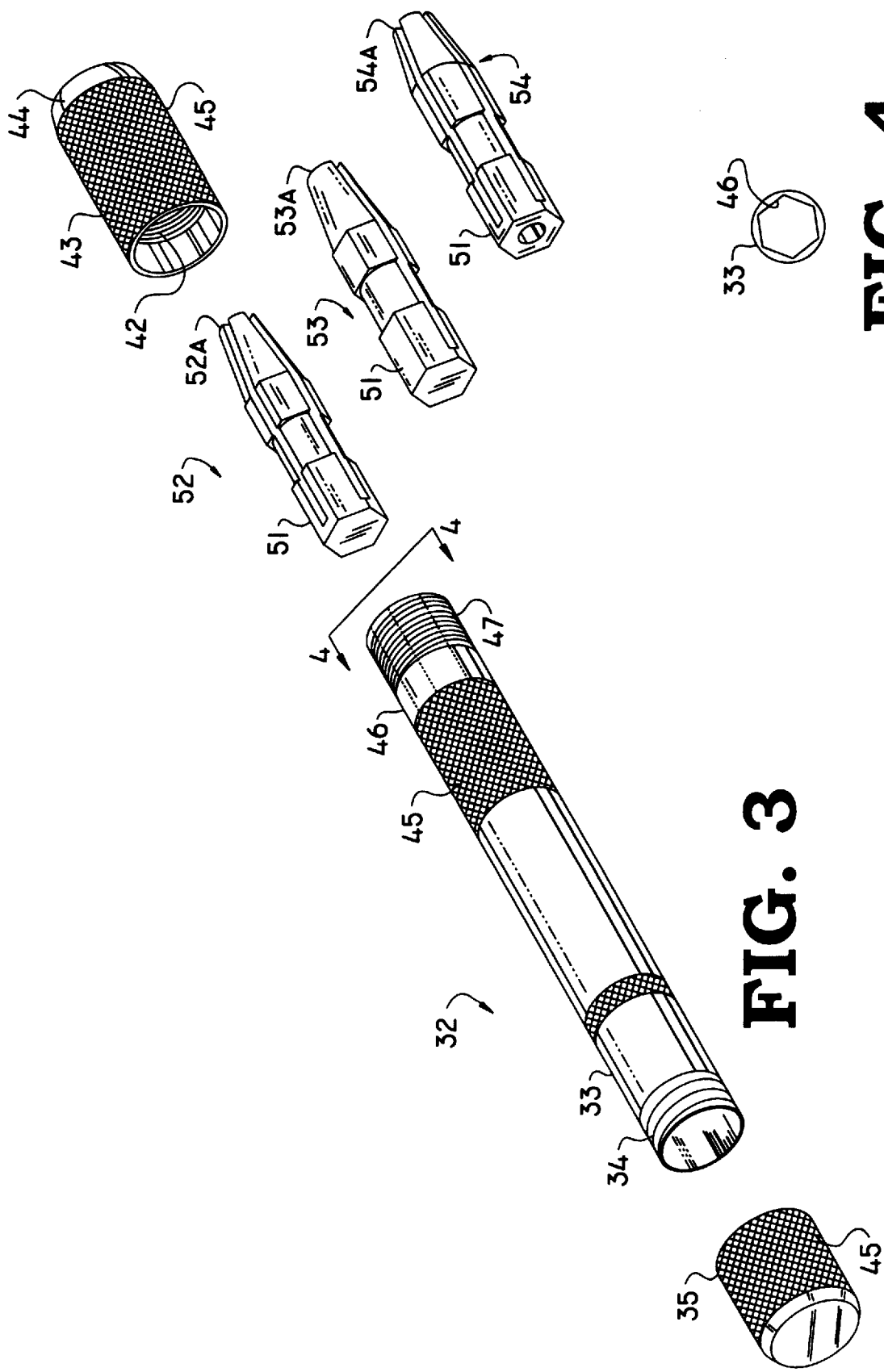

TOOL HOLDER WITH INTERCHANGEABLE COLLET/CHUCK SYSTEM

FIELD OF THE INVENTION

The present invention relates to a tool holder with an interchangeable collet/chuck system, and, more particularly, to such a tool holder which is adaptable to hold a variety of round, hex or square shank tools including hand held drills, files, wire sets, etc. The tool holder includes an elongate barrel incorporating a female hex shaped receiver. The hex receiver in the tool holder is sized to receive a hex shaft of one of a plurality of collet/chucks which collet/chucks are, in turn, adapted to hold a tools, such as a drill bit, miniature file, wire, etc. for use with the tool holder. The tool holder includes external threads for receiving a threaded compression sleeve which tightens onto the tool holder barrel to clamp the collet/chuck around the tool.

BACKGROUND OF THE INVENTION

It is known to create small hand tools including elongate tool holders for diverse uses such as screw driver sets, drill sets, wire sets, miniature files, hones, etc. which holders are machined from tubular metal stock. The metal stock is cut into suitable lengths for use as a tool holder and machined with external threads to hold, at one end, a compression sleeve for tightening about a collet/chuck which holds the tools as they are used, and, optionally, about the opposite end for an end cap to cover a reservoir within the tool holder to store additional tools. Positioned within the tool holder proximate the chuck end thereof, is typically provided a press fitting sized to receive a round shaft of the collet/chuck in a press fit arrangement. The collet/chuck and the compression sleeve are sized and shaped to receive the appropriate tool or tools. The collet/chuck has slots which form a tool receiving opening, with the slots being spring loaded such that the slot or slots spring outward to a normal, resting size which releases the tool shaft when the compression sleeve is loosened, with the slot or slots being constricted inward to grip the tool shaft as the compression sleeve is tightened onto the tool barrel. Typically, the barrel of the tool holder, and the compression sleeve as well, will be machined with a grip pattern, such as herringbone or the like, which facilitates an operator gripping the tool holder and the compression sleeve.

A number of problems occur with these prior art tool holders, among which is the tendency for the press fit collet/chuck to turn within the tool holder if an unusual amount of torque is applied to a held tool, and thus to the collet/chuck by a user. Once the collet/chuck breaks free of its press fitting, the tool holder is typically ruined. In addition, since the collet/chuck is press fit into the tool holder, it cannot be removed, thus the collet/chuck size and slot design are fixed. This limits the versatility of the tool holder to a specific shaft size and shape of tool, e.g. either round, square or hex shaped shafts of a limited diameter range.

It is clear, then, that a need exists for a tool holder design which prevents a collet/chuck from turning when a tool which it is holding is subjected to high torque. Such a tool holder should also allow collet/chucks to be interchanged such that tools with round, square, hex or other shaped shafts or varying diameters can be used with the same tool holder.

SUMMARY OF THE INVENTION

The present invention is drawn to a tool holder with interchangeable collet/chuck system. The tool holder includes an elongate barrel with external threads near one end which accommodate a compression sleeve with internal threads. Within the tool holder barrel near the external threads is a female hex shaped receptacle which is sized to accommodate a male hex shaft of a tool holding collet/chuck. Each collet/chuck is preferably made from lengths of hex shaped cold rolled steel (CRS) which is slotted two or four ways at the end opposite the hex shaft, and, optionally, drilled through to form a chuck opening for accommodating a particular type of tool shaft. Each collet/chuck has a turned diameter along its length which achieves a spring loading effect for the slot or slots such that they can be easily closed or opened. The hex shaped receptacle in the tool holder and the hex shafts of the collet/chucks act to prevent the collet/chucks from turning when the tool which they are holding is subjected to high levels of torque and also allow collet/chucks to be easily interchanged so that a single tool holder can be used to accommodate tools with a variety of shaft cross-sectional diameters and shapes, such as round, square, hexagonal, etc.

OBJECTS AND ADVANTAGES OF THE INVENTION

The objects and advantages of the present invention include: providing a tool holder with interchangeable collet/chucks; providing such a tool holder with a hex receiver for accommodating hex shafts of a variety of collet/chucks; providing such a tool holder with such a collet/chuck receiver which prevents collet/chucks from rotating when a tool they are holding is subjected to a high level of torque; providing such a tool holder which can be used with a variety of tools and tools with a variety of shaft cross-sectional diameters and shapes such as round, square, hexagonal, etc.; providing such a tool holder which is versatile and adaptable; and providing such a tool holder which is relatively simple, economical to manufacture, yet is durable and particularly well suited to its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective, exploded view of a prior art tool holder and collet/chuck in which the collet/chuck is press fit into the tool holder.

FIG. 2 is an end elevational view of the barrel of the prior art tool holder of FIG. 1, taken along the line 2—2 of FIG. 1, and illustrating a round press fit receiver located within the interior of the barrel of the prior art tool holder.

FIG. 3 is a perspective, exploded view of the inventive tool holder and collet/chuck in which a plurality of collet/chucks each include shafts which are hex shaped in cross-section and the tool holder is equipped with a hex shaped collet/chuck receiver.

FIG. 4 is an end elevational view of the barrel of the inventive tool holder of FIG. 3, taken along the line 4—4 of FIG. 3, and illustrating a female hex shaped receiver located within the interior of the barrel of the tool holder.

DETAILED DESCRIPTION OF THE INVENTION

Figure 5:
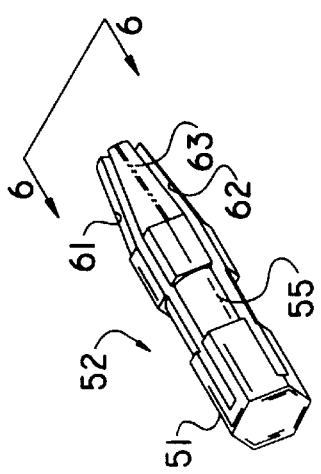
FIG. 5 is a greatly enlarged, perspective view of a first of the collet/chucks of FIG. 3, which collet/chuck is double slotted and machined to accommodate small diameter square or hex shafted tools.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1 of the drawings, a prior art tool holder, generally indicated at 1, is illustrated. The prior art tool holder 1 includes a main barrel 2, illustrated here as cylindrical, which barrel 2 includes external threads 3 at one end to accommodate a threaded end cap 4. A hollow interior 5 of the barrel 2 thus functions as a tool storage area which is accessible by removing the end cap 5. The barrel 2 also has external threads 11 at the end opposite the end cap 4, which threads 11 accommodate interior threads 12 of a compression sleeve 13. Positioned within the interior of the barrel 2 proximate the threads 11 is a round press fit receiver 14, better illustrated in FIG. 2. A collet/chuck 15, shown here as incorporating double slots 21 and 22, has a shaft 23 which is round in cross-section and is sized to press fit snugly within the receiver 14. The collet/chuck 15 is machined to include a narrow waist portion 24 which facilitates the spring action of the slots 21 and 22. Once the collet/chuck 15 is press fit into place within the barrel 2, then a tool (not shown) such as a screwdriver bit, drill bit or the like, is inserted into an open tool receiving end 25 of the slots 21 and 22. The compression sleeve 13, which tapers inward at a terminal end 30 thereof, is threaded onto the threads 11 and tightened down, which clamps the collet/chuck slots 21 and 22 together about the tool in a known fashion. The barrel 2, end cap 4 and compression sleeve 13 can all be machined to include knurling 31 to enable a user to better grip these elements.

As explained earlier, the prior art tool holder 1 has two problems. First, when a clamped tool, such as a screwdriver bit, is subjected to a high level of torque by a user, the press fit collet/chuck 15 can break free of its press fitting and turn within the barrel 2. This can render the tool holder 1 worthless since the press fit receiver 14 will typically be distorted, preventing the collet/chuck 15 from being reseated within the barrel 2. In addition, with a press fitting, the collet/chuck 15 is fixed and cannot be removed. This means that the tool holder 1 can only be used with tools for which the collet/chuck 15 is designed and sized. For example, only tools with slender, round shafts might be accommodated by the dual slotted collet/chuck, which means that square shafted or hex shafted tools or tools with shafts larger than the expansion capability of the collet/chuck 15 could not be used effectively.

The inventive tool holder, generally indicated at 32, is illustrated in FIG. 3. The tool holder 32 includes a barrel 33, again shown as cylindrical, with upper external threads 34 to accommodate interior threads of an end cap 35. On the opposite end the barrel 33 includes external threads 41 to accommodate interior threads 42 of a compression sleeve 43, which compression sleeve 43 has an inner diameter which tapers inward to a smaller diameter at a distal open end 44. The barrel 33, the end cap 35 and the compression sleeve 43 can all be machined to include non-slip knurled gripping areas 45.

Within the barrel 33, as shown in FIGS. 3 and 4, a hex shaped receiver 46 is sized to removably receive hex shafts 51 of one of a plurality of collet/chucks 52, 53 and 54. The collet/chucks 52, 53 and 54 can thus be interchangeably inserted within the tool holder barrel 33 such that a variety of tool sizes and shapes can be used with the same tool holder 32, as explained below. The receiver 46 is deep enough to allow terminal ends 52a, 53a and 54a to protrude slightly past the compression sleeve 43 when it is fully tightened onto the threads 41 so that the tool receiving openings formed by the slotted collet/chuck (as described below) is compressed tightly around a held tool (not shown).

Figure 6:
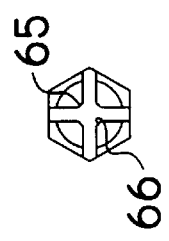
FIG. 6 is an end elevational view of the collet/chuck of FIG. 5, taken along the line 6—6 of FIG. 5, and illustrating the machining of the double slot.

FIGS. 5–10 better illustrate the collet/chucks 52, 53 and 54, which collet/chucks 52, 53 and 54 are each preferably machined from a single piece of hex shaped CRS material. Referring to FIGS. 5 and 6, the collet/chuck 52 includes the hex shaft 51 which represents the remainder of the hex shaped CRS length after machining. A machined narrow waist portion 55 is sized to vary the tension of dual orthogonal slots 61 and 62, which are also machined out of the CRS stock. A terminal portion 63 of the collet/chuck 52 is tapered to accommodate the end opening 44 of the compression sleeve 43 as it is tightened onto the threads 41. Corners 65 formed at the intersections of the slots 61 and 62 are machined to form angled bevels 66 to accommodate respective sides of square or hex shaped tool shafts (not shown).

Figure 7:
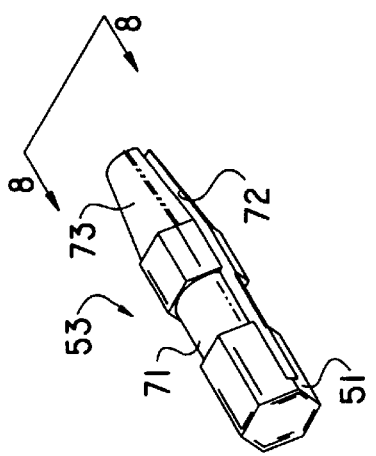
FIG. 7 is a greatly enlarged, perspective view of a second of the collet/chucks of FIG. 3, which collet/chuck is single slotted and machined to accommodate smaller diameter round shafted tools.
Figure 8:
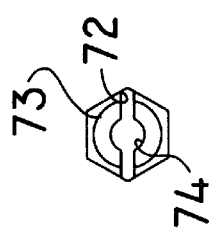
FIG. 8 is an end elevational view of the collet/chuck of FIG. 7, taken along the line 8—8 of FIG. 7, and illustrating the drilling of the single slot.

Referring to FIGS. 7 and 8, the collet/chuck 53 includes the hex shaft 51 and a narrow waist portion 71 which is sized to vary the tension of a single spring loaded slot 72. A terminal portion 73 of the collet/chuck 53 is also tapered to accommodate the compression sleeve end opening 44. The slot 72 is drilled to yield a circular tool receiving opening 74 to accommodate smaller diameter round tool shafts (not shown).

Figure 9:
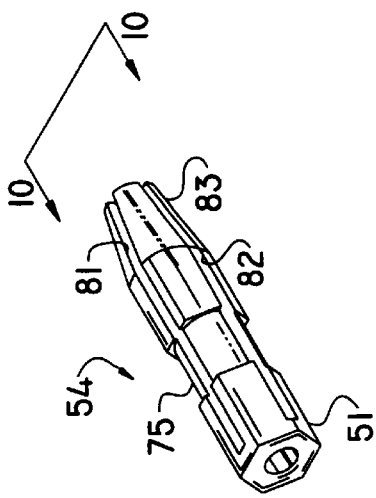
FIG. 9 is a greatly enlarged, perspective view of a third of the collet/chucks of FIG. 3, which collet/chuck is double slotted and machined to accommodate larger diameter round shafted tools.
Figure 10:
FIG. 10 is an end elevational view of the collet/chuck of FIG. 9, taken along the line 10—10 of FIG. 9, and illustrating the drilling of the double slot.

Referring to FIGS. 9 and 10, the collet/chuck 54 includes the hex shaft 51 and a narrow waist portion 75 sized to vary the tension of dual orthogonal slots 81 and Referring to FIGS. 9 and 10, the collet/chuck 54 includes the hex shaft 51 and a narrow waist portion 75 sized to vary the tension of dual orthogonal slots 81 and 82. A terminal portion 83 of the collet/chuck 54 is tapered for the same reasons described above. A tool receiving opening 84 is machined to yield a circular configuration to accommodate larger diameter round tool shafts (not shown).

In addition to the illustrated collet/chucks 52, 53, and 54, numerous other machined shapes are possible. Furthermore, while the receiver 46 and the collet/chuck shafts 51 have been illustrated and described as hex shaped, many other shapes can be used, such as triangular, square, pentagonal, octagonal, etc. as long as the chosen cross-sectional shape prevents the collet/chuck from rotating within the receiver 46 when the tool is subjected to high levels of torque.

It is thus to be understood that while certain forms of the present invention have been illustrated and described herein, it is not to be limited to the specific forms or arrangement of parts described and shown.

What is claimed and desired to be secured by Letters Patent is as follows:

1. A tool holder comprising:
   a) an elongate barrel with external threads near a first end thereof;
   b) a compression sleeve with internal threads which mate with said external threads of said barrel, said compression sleeve being open at both ends and having an internal diameter tapering inward near an open end distal from said internal threads;
   c) a multi-sided receiver rigidly positioned within the interior of said barrel proximate said first end; and
   d) a plurality of interchangeable tool holding collet/chucks, each with a multi-sided shaft at a first end, each said shaft being sized to removably fit within said multi-sided receiver, each said collet/chuck including a terminal portion with a tool receiving opening sized to receive the shaft of a tool to be held, said tool receiving opening being formed by at least one slot extending across said terminal portion, said terminal portion tapering outward in external diameter from an end distal to said shaft back toward said shaft, wherein each of said plurality of collet/chucks has a different slot orientation and/or tool receiving opening size or shape such that tools with a plurality of different shaft sizes and shapes can be used with the tool holder.

2. A tool holder as in claim 1, wherein:
   a) said receiver is hexagonally shaped; and
   b) said shaft of said collet/chuck has a hexagonally shaped cross-section.

3. A tool holder as in claim 1, wherein:
   a) said plurality of collet/chucks include collet/chucks with single slots, multiple slots, round tool receiving openings, and multiple sided tool receiving openings.

* * * * *